(12) United States Patent
Nagatsuka

(10) Patent No.: US 7,127,097 B2
(45) Date of Patent: Oct. 24, 2006

(54) IMAGE PROCESSING APPARATUS, IMAGE PROCESSING METHOD, PROGRAM FOR EXECUTING IMAGE PROCESSING METHOD, AND STORAGE MEDIUM THAT STORES PROGRAM FOR EXECUTING IMAGE PROCESSING METHOD

(75) Inventor: Sumiya Nagatsuka, Tokyo (JP)

(73) Assignee: Konica Corporation, Tokyo (JP)

( * ) Notice: Subject to any disclaimer, the term of this patent is extended or adjusted under 35 U.S.C. 154(b) by 765 days.

(21) Appl. No.: 10/207,164

(22) Filed: Jul. 29, 2002

(65) Prior Publication Data

US 2003/0031355 A1 Feb. 13, 2003

(30) Foreign Application Priority Data

Aug. 9, 2001 (JP) ............................. 2001-242115

(51) Int. Cl.
*G06K 9/00* (2006.01)
(52) U.S. Cl. ...................... 382/132; 382/128; 382/169; 382/274
(58) Field of Classification Search ................ None
See application file for complete search history.

(56) References Cited

U.S. PATENT DOCUMENTS

| | | | |
|---|---|---|---|
| 5,471,987 A * | 12/1995 | Nakazawa et al. ......... 600/436 |
| 5,493,622 A * | 2/1996 | Tsuchino et al. ........... 382/132 |
| 6,504,897 B1 * | 1/2003 | Yonekawa .................... 378/63 |
| 6,577,753 B1 * | 6/2003 | Ogawa ........................ 382/132 |
| 6,633,657 B1 * | 10/2003 | Kump et al. ................. 382/128 |

* cited by examiner

Primary Examiner—Bhavesh M. Mehta
Assistant Examiner—Christopher Lavin
(74) *Attorney, Agent, or Firm*—Frishauf, Holtz, Goodman & Chick, P.C.

(57) ABSTRACT

There is described an image-processing apparatus for converting a first image data inputted into the image-processing apparatus to a second image data used in a visible-image outputting apparatus, which forms an image so as to make it visible for a human eyesight based on the second image data. The image-processing apparatus includes a data-characteristics acquiring section to acquire data-characteristics of the first image data, including at least one of a dynamic range and a frequency characteristic, by analyzing the first image data inputted into the image-processing apparatus; a memory section to store apparatus-characteristics of the visible-image outputting apparatus; and a processing section to adaptively change a data-converting method for converting the first image data to the second image data, corresponding to the data-characteristics of the first image data acquired by the data-characteristics acquiring section and the apparatus-characteristics of the visible-image outputting apparatus, stored in the memory section.

12 Claims, 4 Drawing Sheets

MEDICAL DEPARTMENT:
INTERNAL MEDICINE

REGION: CHEST

MEDICAL DEPARTMENT: SURGERY

REGION: HAND

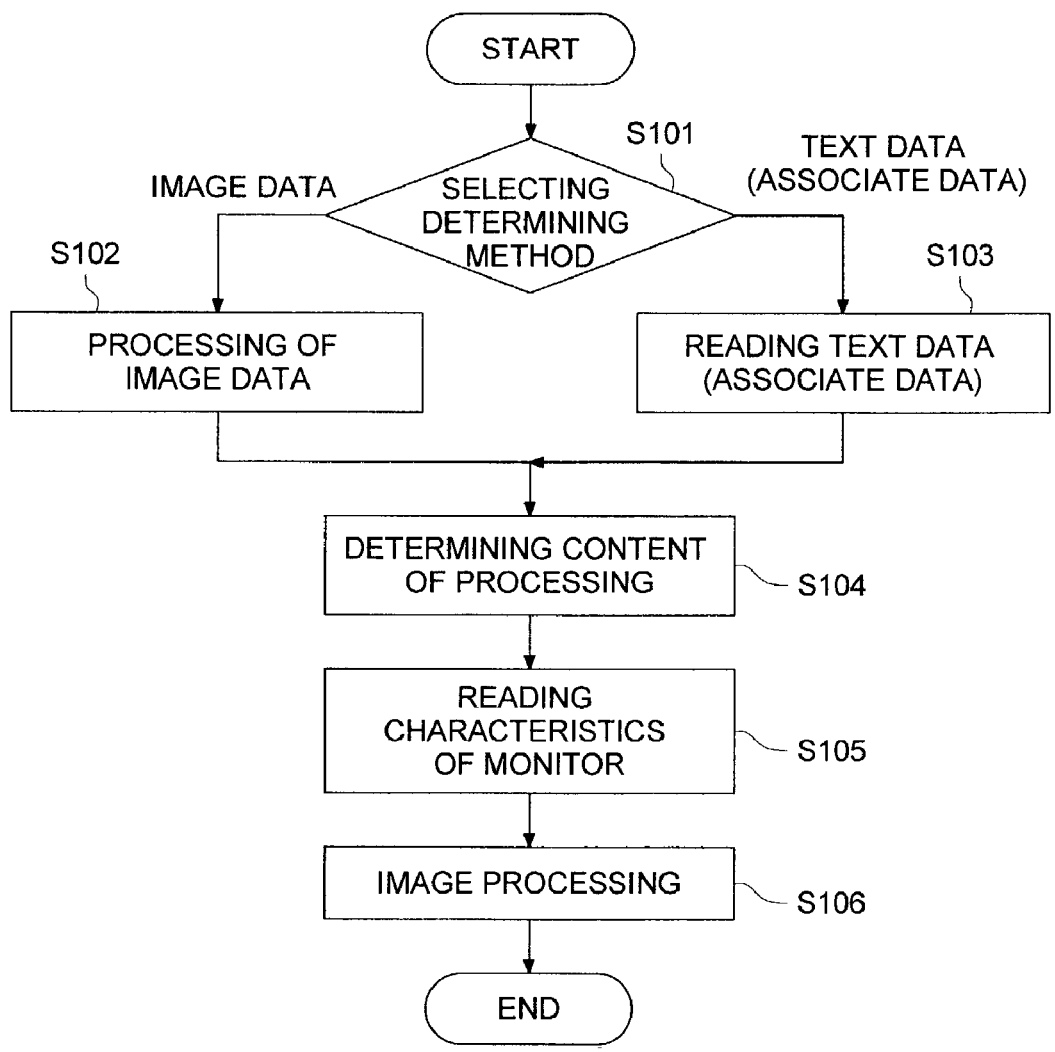

IMAGE PROCESSING APPARATUS, IMAGE PROCESSING METHOD, PROGRAM FOR EXECUTING IMAGE PROCESSING METHOD, AND STORAGE MEDIUM THAT STORES PROGRAM FOR EXECUTING IMAGE PROCESSING METHOD

BACKGROUND OF THE INVENTION

The present invention relates to an image processing apparatus, image processing method, program for executing the image processing method, and storage medium that stores the program for executing the image processing method and more specifically to an art suitable for the medical field.

Conventionally, patient's images, such as X-ray images, have been developed as film and observed by an image inspector, such as a doctor, to serve for the diagnosis. Also, the technology has recently been developed that renders medical images, such as X-ray images, as image data and forms the data as images according to the necessity. This kind of technology has such advantages as it does not take up as much storage space as film does and the image quality does not deteriorate over time.

There are two methods for handling medical images as image data: one method that renders images in a medium such as film before being viewed, and another method that displays images on a monitor such as a CRT. When displaying images on a monitor, images are not always clearly viewed by an image interpreter depending on the part of the body, such as a chest, hand, or foot.

One reason for this problem is that the image's dynamic range or frequency is not compatible with the display environment of the monitor. For example, the dynamic range of a monitor is fixed at 1:700, and the frequency characteristics of the monitor tend to decrease on the high-frequency side. Specifically, the lung's blood vessels in the chest that appear as a relatively high-frequency image are difficult to interpret due to the characteristics of the monitor. However, images of bones in the hand or foot are mostly easy to interpret despite of the characteristics of the monitor. Therefore, how to make the image data compatible with the characteristics of the monitor is a problem.

SUMMARY OF THE INVENTION

To overcome the abovementioned drawbacks in conventional image-processing apparatus, it is an object of the present invention to provide an image processing apparatus which applies suitable processing according to an image so as to properly render the image on the monitor, an image processing method, a program for executing the image processing method, and a storage medium that stores the program for executing the image processing method.

Accordingly, to overcome the cited shortcomings, the abovementioned object of the present invention can be attained by image-processing apparatus and image-processing methods described as follow.

(1) An image-processing apparatus for converting a first image data inputted into the image-processing apparatus to a second image data used in a visible-image outputting apparatus, which forms an image so as to make it visible for a human eyesight based on the second image data, the image-processing apparatus comprising: a data-characteristics acquiring section to acquire data-characteristics of the first image data, including at least one of a dynamic range and a frequency characteristic, by analyzing the first image data inputted into the image-processing apparatus; a memory section to store apparatus-characteristics of the visible-image outputting apparatus; and a processing section to adaptively change a data-converting method for converting the first image data to the second image data, corresponding to the data-characteristics of the first image data acquired by the data-characteristics acquiring section and the apparatus-characteristics of the visible-image outputting apparatus, stored in the memory section.

(2) The image-processing apparatus of item 1, wherein, based on image data corresponding to an image of a part of human body to be visualized by the visible-image outputting apparatus, the data-characteristics acquiring section acquires the data-characteristics of the first image data.

(3) The image-processing apparatus of item 1, wherein, based on image data corresponding to an image of a part of human body to be visualized by the visible-image outputting apparatus, the data-characteristics acquiring section selects associate data relating to the image data, and then, the data-characteristics acquiring section acquires the data-characteristics of the first image data, based on the associate data.

(4) The image-processing apparatus of item 3, wherein the associate data includes information in respect to a name of a medical department, in which the image of the part of human body, to be visualized by the visible-image outputting apparatus, is utilized for making a diagnosis on the part of human body.

(5) The image-processing apparatus of item 3, wherein the associate data includes information in respect to a name of the part of human body, to be visualized by the visible-image outputting apparatus.

(6) The image-processing apparatus of item 1, wherein the visible-image outputting apparatus is an image-displaying monitor.

(7) The image-processing apparatus of item 1, wherein the visible-image outputting apparatus is a printer.

(8) An image-processing method for converting a first image data inputted into an image-processing apparatus to a second image data used in a visible-image outputting apparatus, which forms an image so as to make it visible for a human eyesight based on the second image data, comprising the steps of: acquiring data-characteristics of the first image data, including at least one of a dynamic range and a frequency characteristic, by analyzing the first image data inputted into the image-processing apparatus; storing apparatus-characteristics of the visible-image outputting apparatus in a memory; and adaptively changing a data-converting method for converting the first image data to the second image data, corresponding to the data-characteristics of the first image data acquired in the acquiring step and the apparatus-characteristics of the visible-image outputting apparatus, stored in the memory.

(9) The image-processing method of item 8, further comprising the step of: acquiring the data-characteristics of the first image data, based on image data corresponding to an image of a part of human body to be visualized.

(10) The image-processing method of item 8, further comprising the steps of: selecting associate data relating to image data, which correspond to an image of a part of human body to be visualized, based on the image data; and acquiring the data-characteristics of the first image data, based on the associate data selected in the selecting step.

(11) The image-processing method of item 10, wherein the associate data includes information in respect to a name of a medical department in which the image of the part of human body, to be visualized, is utilized for making a diagnosis on the part of human body.

(12) The image-processing method of item 10, wherein the associate data includes information in respect to a name of the part of human body, to be visualized.

(13) The image-processing method of item 8, wherein the visible-image outputting apparatus is an image-displaying monitor.

(14) The image-processing apparatus of item 8, wherein the visible-image outputting apparatus is a printer.

(15) A program of executing an image-processing method for converting a first image data inputted into an image-processing apparatus to a second image data used in a visible-image outputting apparatus, which forms an image so as to make it visible for a human eyesight based on the second image data; wherein the image-processing method comprises the steps of: acquiring data-characteristics of the first image data, including at least one of a dynamic range and a frequency characteristic, by analyzing the first image data inputted into the image-processing apparatus; storing apparatus-characteristics of the visible-image outputting apparatus in a memory; and adaptively changing a data-converting method for converting the first image data to the second image data, corresponding to the data-characteristics of the first image data acquired in the acquiring step and the apparatus-characteristics of the visible-image outputting apparatus, stored in the memory.

(16) A storage medium storing a program of executing an image-processing method for converting a first image data inputted into an image-processing apparatus to a second image data used in a visible-image outputting apparatus, which forms an image so as to make it visible for a human eyesight based on the second image data; wherein the image-processing method comprises the steps of: acquiring data-characteristics of the first image data, including at least one of a dynamic range and a frequency characteristic, by analyzing the first image data inputted into the image-processing apparatus; storing apparatus-characteristics of the visible-image outputting apparatus in a memory; and adaptively changing a data-converting method for converting the first image data to the second image data, corresponding to the data-characteristics of the first image data acquired in the acquiring step and the apparatus-characteristics of the visible-image outputting apparatus, stored in the memory.

Further, to overcome the abovementioned problems, other image-processing apparatus and image-processing methods, embodied in the present invention, will be described as follow:

(17) The present invention provides an image processing apparatus for converting input image data into image data to be displayed on a monitor, wherein the method of the image data conversion processing is changed according to the characteristics of both the input image data and the monitor that displays the images; for example, to respond to the characteristics of the monitor, when blood vessels are rendered, the image processing is applied by highlighting high-frequency components; however, when bones are rendered, the image processing is applied by highlighting low-frequency components (or no image processing is applied); thereby, images to be interpreted can be accurately displayed on the monitor according to the characteristics of the image data (image contents, etc.). Moreover, with regard to determining the "characteristics of image data", it is possible to determine the contents of the image to be interpreted by extracting either the dynamic range or frequency components from the input image data, or by reading additional stored data associated with the image, such as a radiographed region or a medical department name.

(18) Furthermore, it is preferable that the image data be obtained by taking a radiograph of at least a part of the body so that the image unique to each region of the body can be properly displayed on the monitor.

(19) The present invention provides an image processing method for converting input image data into image data to be displayed on a monitor, wherein the method of the image data conversion processing is changed according to the characteristics of both the input image data and the monitor that displays the images; for example, to respond to the characteristics of the monitor, when blood vessels are rendered, the image processing is applied by highlighting high-frequency components; however, when bones are rendered, the image processing is applied by highlighting low-frequency components (or no image processing is applied); thereby, images to be interpreted can be accurately displayed on the monitor according to the characteristics of the image data (image contents, etc.).

(20) Furthermore, it is preferable that the image data be obtained by taking a radiograph of at least a part of the body so that the image unique to each region of the body can be properly displayed on the monitor.

(21) Furthermore, it is preferable that a program for executing the above-mentioned image processing method be provided.

(22) Furthermore, it is preferable that a storage medium which stores the above-mentioned program be provided.

BRIEF DESCRIPTION OF THE DRAWINGS

Other objects and advantages of the present invention will become apparent upon reading the following detailed description and upon reference to the drawings in which:

FIG. 6 shows a flowchart for explaining a image-processing method embodied in the present invention.

DETAILED DESCRIPTION OF THE PREFERRED EMBODIMENT

Figure 1:
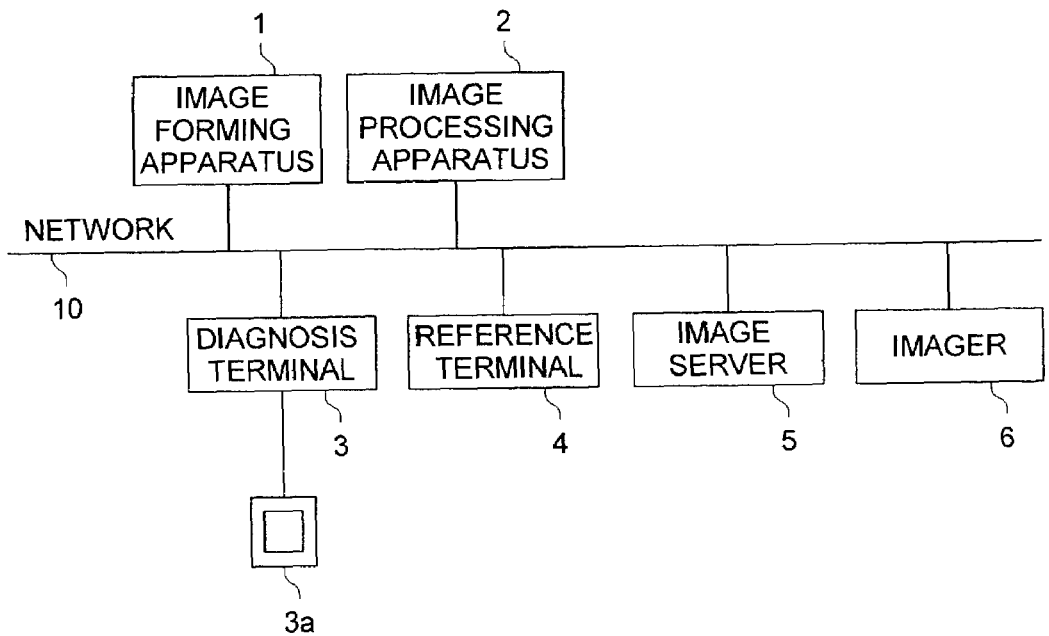
FIG. 1 shows a configuration of a medical network system according to an embodiment of the present invention.

A medical network system that includes a medical image processing apparatus which is an embodiment of the present invention will be described in reference to the drawings. FIG. 1 illustrates the configuration of the medical network system.

A medical network system, shown in FIG. 1, comprises a medical image forming apparatus 1 for forming medical images by the imaging modality of CR (computed radiography) that scans the photo-stimulable phosphor panel which has recorded radiation image information about a photogenic subject (patient) by using an excitation light and photoelectrically converts the emitted light thereby obtaining image information; a medical image processing apparatus 2 that receives an image file from the medical image forming apparatus 1, applies image processing, and outputs the image information; and a diagnosis terminal 3 which is composed of a personal computer (PC) or a workstation and has a monitor 3a for a roentgenologist to view the images for diagnosis.

The medical network system, shown in FIG. 1, further comprises a reference terminal 4 which is composed of a PC or a workstation and has a monitor with an image quality such as resolution that may be lower than that of the diagnosis terminal 3 because it is used basically for referring to images but not for diagnosis; an image server 5 which is composed of a PC or a workstation and stores image files in the image database, retrieves and reads images from the diagnosis terminal 3 and the reference terminal 4; and an imager (printer) 6 that outputs image data received from the medical image forming apparatus 1 or the medical image processing apparatus 2 as visible images on a recording medium such as film or paper. Apparatuses 1 to 6 are connected online via a network 10 so that each apparatus can send and receive information to one another.

Figure 2:
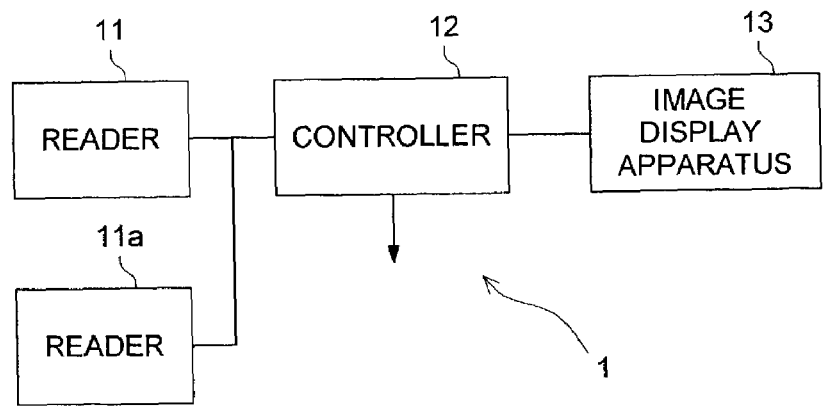
FIG. 2 is a block diagram that illustrates a medical image forming apparatus 1 shown in FIG. 1.
Figure 4:
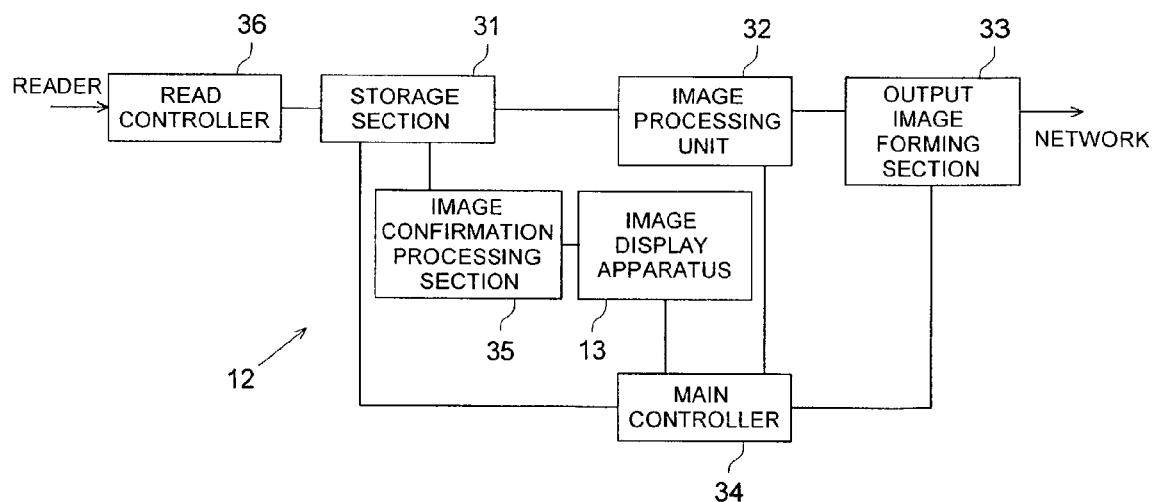
FIG. 4 is a block diagram that illustrates a controller for the medical image forming apparatus 1 shown in FIG. 2.

Next, detailed explanations of the following items A to I which are related to the medical image forming apparatus 1, shown in FIG. 1, will be provided:

A. Apparatus Configuration
B. Information
C. File
D. Input and Display of the Main Information
E. Appointment Procedures
F. Radiographic Procedures
G. Transfer
H. Output Image Forming
I. Utility Function A. Apparatus Configuration FIG. 2 is a block diagram that illustrates a medical image forming apparatus 1 and FIG. 4 is a block diagram that illustrates a controller shown in FIG. 2.

a. As shown in FIG. 2, the medical image forming apparatus 1 comprises a radiation image input apparatus (reader) 11 for reading radiation image information of a subject (patient) from the photo-stimulable phosphor panel that stores and records the information and converting the information into digital image data; a controller 12 for controlling the operations of the entire radiographic system; and an image display apparatus 13 which is composed of a CRT display or a liquid crystal panel and displays the digital image data obtained by the reader 11. Moreover, the medical image forming apparatus 1 may comprise a reader 11a and may include two or more readers. It also includes information input devices such as an input keyboard, mouse, etc.

b. The controller 12 makes up a man-machine interface operated by a user (radiologist) and controls the entire medical image forming apparatus 1. As shown in FIG. 4, the controller 12 includes a read controller 36 for receiving image data from the readers 11 and 11a and conducting compensation processing in real time; a storage section 31 which is composed of a hard disk or a RAM and stores various information about image files received from the read controller 36; an image processing section 32 for processing images about image information in the image file; an output image forming section 33 for forming images to be sent out; an image confirmation processing section 35 for processing images and displaying reduced images on the display apparatus 13 for confirming the images; and a main controller 34 for controlling the operations of the entire apparatus including the above-mentioned parts 31 to 33, 35, and the display apparatus.

c. Specifically, the controller 12 is used for conducting the following operations #1 to #7:
1 A user operates the controller for the radiography appointments.
2 A user operates the controller to take radiographs.
3 The controller receives image data read by the readers 11 and 11a.
4 The controller temporarily stores image data in the storage section 31.
5 The controller processes images by means of the image processing section 32.
6 The controller forms images to be output by means of the output image forming section 33.
7 The controller transfers the images to an external apparatus such as an image server 5, etc. via a network 10.

B. Information

Information handled by the medical image forming apparatus 1 can be divided into the following five categories:

[a. Radiographic Information]

This is image data information that has been obtained by taking X-ray photos and is sent as an image file to an external apparatus such as an image server 5, etc. The radiographic information includes the following:

(a) Reader Reading Condition

This is information concerning the reading method performed by the readers 11 and 11a, that is, the reading zone, reading pixel size, and reading sensitivity.

(b) X-Ray Apparatus Information

This is the control information when the X-ray radiographic apparatus is connected to the network 10 online and can be controlled by the system shown in FIG. 1. This information includes X-ray tube voltage, X-ray tube current, X-ray irradiation time, and irradiation zone.

(c) Image Processing Information

This information is about image data processing methods concerning the gradation processing and frequency processing that are handled by the image processing section 32.

(d) Output Apparatus Information

This information is about external output apparatuses, such as a diagnosis terminal 3, reference terminal 4, image server 5, and imager 6, shown in FIG. 1, that reproduce and output the image data. Information about the output zone, enlargement or reduction rate, output format (multi-format or split radiographic format), overlay, and the presence or absence of the gradation processing and the frequency processing is specified for each output apparatus.

(e) Overlay Information

This information is about the presence or absence of the overlay, such as AP/PA, R/L, and comment, and location.

(f) Information about Special Conditions

Protect information: After the images have been transferred, image files are stored in the storage section 31 until the protect is removed.

Pending information: Transfer is pended. This information is specified when images are transferred after they have been reviewed.

Priority (urgent) information: This information is specified when a priority is given to the transfer in situations of urgent radiography. This information is registered at the top of the queue.

[b. Patient Information]

This patient information includes the following:

(a) Patient ID information

Patient ID number, name, gender, birthday, etc.

(b) Order Information

This is information about a radiography request made by a doctor that includes information about a patient's conditions, requested date of examination, instructions for the examination method, etc.

[c. Radiography Implementation Information]

This information is about radiography results that include the following:

(a) Radiographic Result

Date of radiography, radiography number etc.

(b) Image Processing Result

This is an image processing parameter calculation result. When an image is sent out, image data is processed by the image processing section 32 based on the result.

(c) System Information

This information contains a part of the system information such as system configuration when the radiograph was taken.

[d. System Information]

This information is for managing and controlling the entire system, shown in FIG. 1, and includes system configuration (external apparatus such as an image server 5, etc. connected and its name), parameters for controlling devices that make up the system, table, and information about output apparatuses such as readers, an imager, and the host.

[e. Image Data]

Image data contains the following:
(a) Image data that has been input from the readers 11 and 11a
(b) Reduced image data to be displayed on the image display apparatus 13 for image confirmation
(c) Reduced image data to be processed by the image confirmation processing section 35
(d) Output image data to which gradation processing or frequency processing has been applied
C. File Files handled by the medical image forming apparatus 1 are stored in the storage section 31 and can be divided into the following seven categories:

[a. Condition File]

The radiographic condition key is used for presetting radiographic conditions, image processing conditions, and output conditions. Each radiographic condition key has a corresponding condition file. The condition file consists of the above-mentioned radiographic information. Classify the files beforehand according to the region to be radiographed (lung, abdomen, head, etc.), radiographic posture (standing position, supine position, etc.), view direction (front, side etc.), patient characteristics (gender, age, constitution, etc.), disease name, radiologist name, and so on; and specify the corresponding names and radiographic information. The controller 12 sets up a condition file group for each classification category, sets up two or more condition files for each condition file group, and stores them in the storage section 31. An optimal condition is chosen when images are formed.

[b. Appointment File]

This file stores information about radiography appointments. One appointment file is created for each radiography. The appointment file consists of radiographic information selected by the radiographic condition key and patient information.

[c. Image Header File]

An image header file is created after the radiography has been finished. The image header file consists of the radiography appointment file (i.e. radiographic information and patient information) and radiography implementation information. When a user wants to refer to and change the radiographic information, patient information, or radiography implementation information, the image header file is referred to.

[d. Reduced Image File]

This file stores image data that has been reduced to a fraction of the original image data by the image confirmation processing section 35 for image confirmation, and includes the data described below. The image reduction method includes simple pixel skipping, averaging, and spline.

(a) Reduced Image Data to be Displayed

This reduced image data is displayed on the image display unit 13, shown in FIGS. 2 and 4, for image confirmation.

(b) Reduced Image Data for Image Processing

This reduced image data is used for calculating parameters to be used for conducting image processing by the image confirmation processing section 35. The reduction rate is chosen so that after a pixel has been reduced it is equal to a predetermined length. This makes it possible to compensate for the difference in read pixel size by using the reduced image. The image processing parameter is calculated by using the reduced image for image processing rather than using image data.

[e. Image Data File]

The compensated image data that has been received from the readers 11 and 11a, shown in FIG. 2, is stored in the storage section 31.

[f. Output Image Data File]

This file stores the output image data to which a specified processing method selected from the frequency processing, gradation processing, overlay, rotation, enlargement, and reduction has been applied.

[g. System File]

This file contains the above-mentioned system information.

D. Input and Display of Main Information

[a. Reading Zone]

1 The reading zone is a place where X-ray images stored in the photostimulable phosphor are converted to image data. Specify an appropriate area according to the region to be radiographed.

2 Specify the reading size, view direction, and location. Register the data beforehand in the condition file.

3 When a condition file is selected, the reading zone is displayed on the screen of the image display apparatus 13, shown in FIG. 2, according to the preset condition. The maximum reading zone (normally, 356×432 mm) is to be equal to the reading zone display area on the screen of the image display apparatus 13. The reading zone is determined by the specified reading size, view direction, and location, and is graphically displayed in the reading zone display area. This makes it possible to select and confirm appropriate reading size, view direction, and location.

4 The irradiation zone is received from the X-ray apparatus and is simultaneously displayed in the reading zone display area.

[b. Output Zone]

1 The output zone is a place where data is output to an external apparatus such as an image server 5, etc.

2 Specify the output size, view direction, trimming location, output location, and enlargement or reduction method. Register the data beforehand in the condition file.

3 When a radiographic condition key is selected, the output zone and the output image zone are determined according to the preset condition and displayed on the screen of the image display apparatus 13. The maximum output zone is to be equal to the output zone display area on the screen of the image display apparatus 13. The output zone and the output image zone are graphically displayed in the output zone display area. This makes it possible to select and confirm an appropriate output zone and output image zone for each apparatus.

[c. Overlay Information]

1 Specify whether or not "AP", "PA", "R", "L", comment, or scale is overlaid; and if overlaid, at which location. Register the data beforehand in the condition file.

2 An output image is displayed in the output zone display area on the screen of the image display apparatus 13, and overlay information is also graphically displayed.

3 By touching a part of the output zone display area to be overlaid, the overlay graphic image is moved to the location.

4 It is possible to select an appropriate overlay and specify the location.

5 It is possible to check that there is no location that is hidden by an overlay. If the overlay interferes with a diagnosis, it can be moved.

[d. Input/Output of Online Information Received from RIS (Roentgenology Information System)]

1 A doctor's order is input. The input order is converted to the format compatible with this system and stored in the appointment file. The region to be radiographed and the radiographic method are converted by using the corresponding radiographic condition key.

2 The image header file is converted to the RIS compatible format and output.

[e. Appointment List]

1 It is possible to display a list of radiography appointments in sequential order of the appointments on the screen of the image display apparatus 13.

2 After the radiograph has been taken, the controller 12 automatically sets the appointment, which has been registered at the top of the appointment list, as a radiographic target.

3 The appointment that had a radiograph taken is not deleted and is stored until the specified number of appointments is registered. This makes it easier to take a radiograph of the same patient or according to the same condition again after the hard copy of the image has been confirmed.

E. Appointment Procedures

Three types of input methods are available according to the environment of the facility where the system, shown in FIG. 1, is installed.

[a. Online]

1 Information necessary for taking radiographs, such as patient information, radiographic information, etc., is received online from RIS via a network 10 and input into the image forming apparatus 1.

2 Normally, a keyboard is not necessary. However, when inputting information which is not contained in the information from RIS, use an information input device such as a keyboard, etc.

3 In regard to patient information, a doctor's order is input online. The multi-task function enables appointments to be made while a radiograph is being taken. Normally, make settings so that all necessary patient information can be input for each facility.

4 In regard to radiographic information, a doctor's order together with patient information is input online. When making an order, a doctor selects an optimal radiographic method from radiographic condition keys. Or, the controller 12 automatically selects a radiographic condition key which is most suitable for the doctor's order.

[b. Magnetic Card, Barcode, Etc.]

1 The minimum of information, such as an ID number, patient name, etc., is input online.

2 When inputting information which is not contained in the card, use a keyboard.

3 The minimum of patient information necessary for radiography is read from a magnetic card, etc. Use a keyboard to input associated information if necessary.

4 In regard to radiographic information, the controller 12 automatically chooses the radiographic condition key which was used when the last radiograph was taken. To change the key, select an appropriate key from the radiographic condition keys.

[c. Keyboard Input]

1 Use a keyboard to input necessary information.

2 Use a keyboard to input patient information. Since it takes time to manually input all of the patient ID numbers, names, and other information, it is possible to use an operation mode for automatically creating a patient ID number based on the amount of radiographs taken (what number of radiograph) and the time when the radiograph was taken and to collate the ID number with an order written on the paper.

3 Select radiographic information from radiographic condition keys.

F. Radiographic Procedures

[a. Procedures for a User to Take Radiographs]

1 When the previous radiography has been finished, or the system enters into the radiographic mode, a screen for the next radiography appears and radiographic information for the appointment listed at the top of the appointment list is displayed on the screen of the image display apparatus 13.

2 When there is no appointment, a radiographic condition key has to be selected at this point to make an appointment. The default is the radiographic condition key which was used for the previous radiography. If radiographic information is insufficient, necessary information must be input at this point.

3 View patient information and radiographic information displayed on the screen of the image display apparatus 13, shown in FIGS. 2 and 4, and make sure that the information is properly set.

4 A user (radiologist) takes radiographs in the same manner as X-ray photos that use film.

5 Radiographic images are read and simultaneously displayed on the screen of the image display apparatus 13.

6 Gradation processing is applied to the images and then the processed images are displayed.

7 A message appears that informs whether or not the radiography and the processing are successful.

8 Make sure that the radiography has been successful by evaluating the images and the message, and then press the key to terminate the radiographic procedure.

9 If radiography failed, press the key to take radiographs again.

[b. System Operations when Radiographs are Taken]

(1) The system enters into the radiographic mode (Press the radiographic mode key). When the system detects that the radiographic mode key has been pressed, the controller 12 switches the control mode to the radiographic mode.

(2) When there are appointments (the presence of appointment files), contents of the appointment which has been registered at the top of the queue for managing appointment files are displayed on the screen of the image display apparatus 13.

(3) When there is no appointment, the controller 12 automatically chooses the radiographic condition key which was used for the previous radiography. Reselect or change the radiographic condition key, or input patient information if necessary.

(4) Pressing the radiography switch of the X-ray irradiation apparatus will start taking radiographs.

(5) An X-ray is irradiated from the X-ray irradiation apparatus onto a subject, the radiation image stored in the photostimulable phosphor panel is scanned by an excitation light, and the data is read by readers 11 and 11a as digital image information.

(6) The read controller 36 receives the image data from the readers, applies compensation processing to the image data in real time, and stores it in the image memory.

(7) The image data stored in the frame memory is reduced to a predetermined reduction rate by the image confirmation processing section 35.

(8) Sequentially, the reduced images which have been processed by the image confirmation processing section 35 are displayed on the screen of the image display apparatus 13.

(9) After the images have been read and displayed, the digital image information is processed according to the method specified by the radiographic condition key and displayed again. Reduced images are used for image processing.

(10) The images are temporarily stored in the storage section 31.

(11) After images have been sequentially displayed on the image display apparatus 13, gradation processing is applied to the images and then the processed images are displayed again.

(12) After the images have been read, the appointment file and the radiography implementation information are stored in the storage section 31 as an image header file.

(13) The reduced image data is stored as a reduced image file in the storage section 31.

(14) The same number is assigned to the image header file, reduced image data file, and image data for management.

(15) These files are automatically stored in the storage section 31 by the main controller 34 of the controller 12 after the images have been read by readers 11 and 11a and before an operator conducts the confirmation operation. This is to prevent loosing radiographed images even if the power has been turned off or a failure has occurred in the system due to an accident or mis-operation by an operator after the images had been read.

(16) After images have been read, it becomes possible for an operator to conduct operations.

(17) When the operator views the radiation image displayed on the image display apparatus 13 and determines that the radiography has been successful, the operator inputs the next radiography key for terminating the radiographic procedure by using the character information input device and terminates the radiographic procedure.

(18) When changing patient information, image processing method, or output method, it is possible to enter new information by using a character information input device.

(19) When the next radiography key is pressed, the current radiography is finished, and the next appointment will automatically be displayed on the image display apparatus 13.

(20) When an operator determines that the radiography failed, the operator presses the re-radiography key, cancels the image, and takes a radiograph again.

(21) When the next radiography key is pressed, the current radiography is terminated and the following processes are applied:

(22) The appointment file is stored as a radiographed appointment file in the storage section 31.

1 When there has been a change prior to when the next radiography key is pressed, the image header file which was stored when the reading was finished is updated.

2 The radiographed image is registered in the queue for transfer to an external apparatus.

3 After an appointment file for the next appointment has been read and displayed, radiography becomes possible.

(23) When the re-radiography key is pressed, the radiographic procedure is finished, and the following processes are applied:

1 The image header file, reduced image file, and image data which have been stored when reading was finished are discarded.

2 It becomes possible to take radiographs of the same appointment.

G. Transfer (1) Transfer is conducted asynchronously with radiography.

(2) A queue is created and managed for each external apparatus, and each queue operates independently and does not interfere with one another. Therefore, transfer is asynchronously conducted for each apparatus.

(3) The queue stores numbers assigned to each image in sequential order of the transfer.

(4) Information about in which queue of what external apparatus an image has been registered is stored as a queue registration table in the storage section 31, updated and managed every time an image is registered in the queue or deleted from the queue.

(5) Images that have been registered in the queue are transferred in sequential order, in which they were registered, to an external apparatus such as an image server 5, etc.; and images that have been transferred are deleted from the queue.

(6) To conduct the transfer operation, specify an image header file and an image data file, which have been stored in the storage section 31, based on the number that has been registered in the queue.

(7) An output image is formed according to the condition stored in the image header file. The image header is converted to the format specified by each output apparatus and is transferred together with the image data file.

H. Output Image Forming

[Image Forming Processing Conducted by the Output Image Forming Section 33]

1 Image data is read from the storage section 31 to the image memory.
2 Frequency processing is conducted.
3 Equalization processing is conducted.
4 Gradation processing is conducted.
5 An image is rotated.
6 Mirror reversal is conducted.
7 Enlargement or reduction is conducted.
8 Overlay is conducted.

Moreover, it is possible to specify in the radiographic information whether or not to conduct the processing procedures #2 to #8 for each output apparatus such as an image server 5, etc. Furthermore, it is also possible to specify that image data, to which specified processing procedures #2 to #8 have been applied, is stored as a processed image data file. Avoid reprocessing the commonly processed part of the image which is output to each output apparatus. For example, when an enlargement or reduction rate of the image varies depending on an output apparatus, if the image that has processing procedures up to #6 finished is stored, when the image is transferred to another apparatus, it is possible to cut back processing time necessary for conducting procedures #2 to #6 by reading the processed image, applying processing procedures #7 and #8 only, and transferring the image. Conduct processing procedures #5 and #6 simultaneously with one of the processing procedures #2, #3 or #4. This reduces the number of accesses to the memory, thereby reducing the processing time.

I. Utility Function

Several utility functions are provided for users.

[a. Utility Function]

Utility functions are restricted as passwords for a general user, manager, or maker. To change information about images, a manager password is required for security.

[b. Image File Operation]

1 An image file list is displayed and information about images stored in the storage section 31 is listed in sequential order of radiography on the image display apparatus 13.
2 Selecting an image from the list will display patient information, radiographic information, and pixel skipped image in the same form as the radiography screen.
3 It is possible to change patient information, an image processing method, and an output method.
4 The image which has been specified as "pending" when a radiograph was taken can be unspecified by making reconfirmation at this point.
5 It is possible to sort the image file list in sequential order of the output to each external apparatus.
6 It is possible to determine whether to output the data to each external apparatus or change the sequential order of output.

[c. Radiography Log and Irradiation Log]

1 Radiographic information and patient information are statistically processed and a radiography log and an irradiation log are provided for a user.
2 It is possible to output the amount of radiography per radiographed region during a specified period and the list of radiographic conditions applied to daily radiographs.

Figure 3:
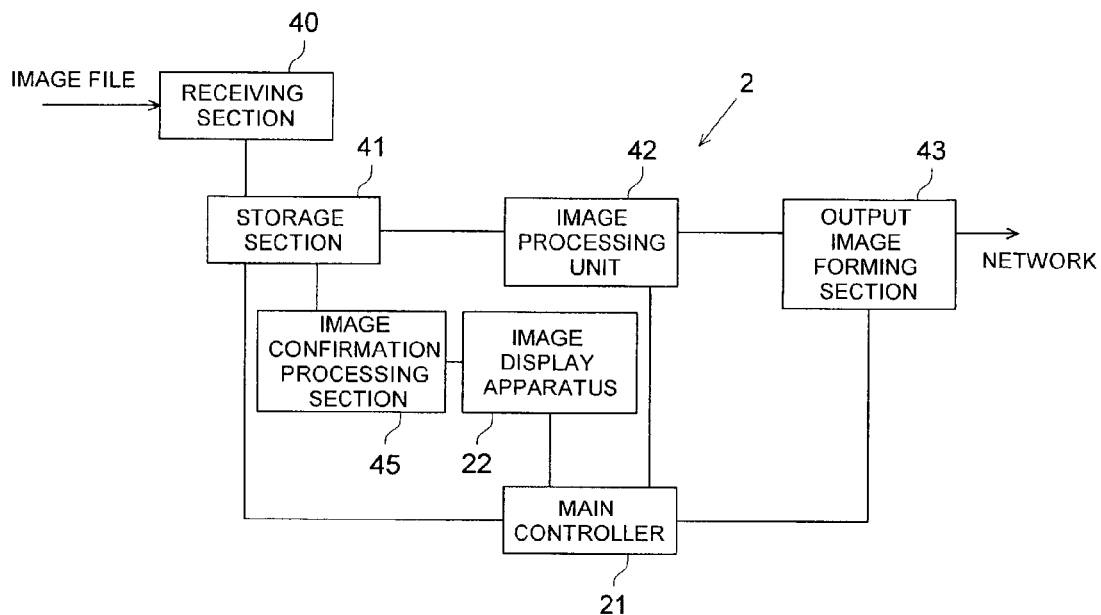
FIG. 3 is a block diagram that illustrates a medical image forming apparatus 2 shown in FIG. 1.

Next, detailed explanations of the following items A to H, which are related to the medical image forming apparatus 2, shown in FIG. 1, will be provided:

A. Apparatus Configuration
B. Information
C. File
D. Input and Display of the Main Information
E. Image Confirmation Procedure
F. Output
G. Output Image Forming
H. Utility Function A. Apparatus Configuration FIG. 3 is a block diagram that illustrates a medical image forming apparatus 2 shown in FIG. 1. The medical image processing apparatus 2, shown in FIG. 3, comprises a main controller 21 for controlling the operations of the entire radiographic imaging system and an image display apparatus 22 which is composed of a CRT display or a liquid crystal panel and displays digital image data obtained by the medical image forming apparatus 1. The medical image processing apparatus 2 can be composed of a personal computer and includes information input devices such as an input keyboard or a mouse.

As shown in FIG. 3, the image processing apparatus 2 further comprises a receiving section 40 for receiving image files from an image forming apparatus 1; a storage section 41 which is composed of a hard disk or a RAM and stores information about the received image files; an image processing section 42 for processing image information contained in the image file; an output image forming section 43 for forming images to be sent to an external apparatus; and an image confirmation processing section 45 for displaying reduced images on an image display apparatus 22 for confirming the received images. The main controller 21 controls each parts 40 to 43, 44, and a display apparatus 22.

The medical image processing apparatus 2 has the following functions, and each function is controlled by the main controller 21.

1 The medical image processing apparatus receives an image file from a medical image forming apparatus 1 in the receiving section 40.
2 The medical image processing apparatus temporarily stores the image file in the storage section 41.
3 The medical image processing apparatus confirms the image quality by viewing the reduced images which have been formed by the image confirmation processing section 45.
4 The medical image processing apparatus conducts image processing by the image processing section 42.
5 The medical image processing apparatus forms the image to be output by the output image forming section 43.
6 The medical image processing apparatus transfers the output image via a network 10 to an external apparatus such as an image server 5, etc.

B. Information

Information handled by the medical image forming apparatus 2 can be divided into the following five categories:

[a. Condition Information]

Condition information is used for processing a received image file and outputting it to an external apparatus such as an image server 5. This information includes the following:

(a) Image Processing Information

This information is about gradation processing and frequency processing that are handled by the image processing section 42.

(b) Output Apparatus Information

This is information about an external output apparatus such as an image server 5 that reproduces and outputs the image data. Information about the output zone, enlargement or reduction rate, output format (multi-format or split radiographic format), overlay, and the presence or absence of the gradation processing and the frequency processing is specified for each output apparatus such as an image server 5, etc.

(c) Overlay Information

This is the information about the presence or absence of the overlay such as AP/PA, R/L, and comment, etc., and location.

(d) Information about Special Conditions

Protect information: After the images have been output, image files are stored in the storage section 31 until the protect is removed.

Pending information: Transfer is pended. This information is specified when images are transferred after they have been reviewed.

Priority (urgent) information: This information is specified when a priority is given to the transfer in situations of urgent radiography. This information is registered at the top of the queue.

[b. Patient Information]

This patient information includes the following:

(a) Patient ID Information

Patient ID number, name, gender, birthday, etc.

(b) Order Information

This is information about a radiography request made by a doctor that includes information about a patient's conditions, requested date of examination, instructions for the examination method, etc.

[c. Radiography Implementation Information]

This information is about image reception results and image processing results.
(a) Image reception result: Date of radiography, etc. are included.
(b) Image processing result: This is an image processing parameter calculation result. When an image is sent out, image data is processed based on the result.
(c) System information: This information contains a part of the system information such as system configuration when the radiograph was taken.

[d. System Information]
(a) Information for managing and controlling the system shown in FIG. 1
(b) Configuration (external apparatus, such as an image server 5, etc., connected, and its name) of the system, shown in FIG. 1
(c) Parameters and table for controlling devices that make up the system, shown in FIG. 1
(d) Preset information about the medical image forming apparatus 1 which is an input device
(e) Preset information about output apparatuses such as an imager 6, and the host

[e. Image Data]
(a) Image data that has been received from the medical image forming apparatus 1
(b) Reduced image data to be displayed which has been created from the image data for image confirmation
(c) Reduced image data to be processed by the image confirmation processing section 45
(d) Output image data to which gradation processing or frequency processing has been applied C. File Files handled by the medical image forming apparatus 2 are stored in the storage section 41 and can be divided into the following seven categories:

[a. Condition File]

The condition key is used for presetting image processing conditions and output conditions for image files. Each condition key has a corresponding condition file. The condition file consists of the above-mentioned condition information. Classify the files beforehand according to the region to be radiographed (lung, abdomen, head, etc.), radiographic posture (standing position, supine position, etc.), view direction (front, side, etc.), patient characteristics (gender, age, constitution, etc.), disease name, radiologist name, and so on; and specify the corresponding names and radiographic information. The main controller 21 sets up a condition file group for each classification category, sets up two or more condition files for each condition file group, and stores them in the storage section 41. An optimal condition is chosen when images have been received.

[b. Image Header File]

An image header file is created after the image has been received. The image header file consists of the radiography appointment file (i.e. radiographic information and patient information) and radiography implementation information. When a user wants to refer to and change the radiographic information, patient information, or radiography implementation information, the image header file is referred to.

[c. Reduced Image File]

This file stores image data that has been reduced to a fraction of the original image data.

(a) Reduced Image Data to be Displayed

This reduced image data is displayed on the image display unit 22, shown in FIG. 3.

(b) Reduced Image Data for Image Processing

This reduced image data is used for calculating parameters to be used for conducting image processing. The reduction rate is chosen so that after a pixel has been reduced it is equal to a predetermined length. This makes it possible to compensate for the difference in read pixel size by using the reduced image. The image processing parameter is calculated by using the reduced image for image processing rather than using image data.

[d. Image File]
(a) The image file consists of image associated information (image header) and image data.
(b) The image header consists of condition information, patient information and radiography implementation information.

When a user wants to refer to and change the condition information, patient information, or radiography implementation information, the image header is referred to.

[e. Output Image File]
This file stores the output image data to which a specified processing method selected from the frequency processing, gradation processing, overlay, rotation, enlargement, and reduction has been applied.

[f. System File]
This file contains the above-mentioned system information.

D. Input and Display of Main Information

[a. Display of Received Image Information]
Received images are displayed as thumbnail images.

[b. Output Information Display]
1 Specify the output size, view direction, trimming location, output location, and enlargement or reduction method. Register the data beforehand in the condition file.
2 When a condition key is selected, the output zone and the output image zone are determined according to the preset condition and displayed on the screen of the image display apparatus 22. The maximum output zone is to be equal to the output zone display area on the screen of the image display apparatus 22. The output zone and the output image zone are graphically displayed in the output zone display area. This makes it possible to select and confirm an appropriate output zone and output image zone for each apparatus.

[c. Overlay Information]
1 Specify whether or not "AP", "PA", "R", "L", comment, or scale is overlaid; and if overlaid, at which location. Register the data beforehand in the condition file.
2 An output image is displayed in the output zone display area on the screen of the image display apparatus 22, and overlay information is also graphically displayed.
3 It is possible to select an appropriate overlay and specify the location.
4 It is possible to check that there is no location that is hidden by an overlay. If the overlay interferes with a diagnosis, it can be moved.

[d. Input/Output of Online Information Received from RIS]
1 A doctor's order is input. The input order is converted to the format compatible with this system and stored in the appointment file. The region to be radiographed and the radiographic method are converted by using the corresponding radiographic condition key.
2 The image header file is converted to the RIS compatible format and output.

[e. Image List]
Image files can be displayed as a list.

E. Image Confirmation Procedure

[a. System Operations when Confirming the Image]
(1) An image file is received from the medical image forming apparatus 1 and stored in the storage section 41.
(2) The image file stored in the storage medium of the storage section 41 is reduced according to the reduction rate predetermined by the image confirmation processing section 45.
(3) Sequentially, reduced images are displayed on the screen of the image display apparatus 22.
(4) After the images have been received and displayed, digital image information is processed according to the method specified by the radiographic condition key and displayed again on the image display apparatus 22. Reduced images are used for determining image processing parameters.
(5) The images are sequentially displayed on the image display apparatus 22; and then gradation processing is applied to the images, and the processed images will be displayed again.
(6) When an operator views the received image on the image display apparatus 22 and determines that the image is normal, the operator enters the reception termination key by using the character information input device and terminates the image confirmation procedure.
(7) When changing patient information, image processing method, or output method, it is possible to enter new information by using a character information input device.
(8) When the image confirmation key is pressed, the image confirmation procedure for the image is terminated, and the next image will automatically be displayed.
(9) When there is a problem with the image, the image processing method can be changed. It is also possible to indicate it as "pending" and change the detailed image processing procedures later.
(10) When the image confirmation key is entered, the image confirmation procedure is terminated, and the following procedures are applied:
1 The image file is stored as a confirmed image file in the storage section 41.
2 Images that have been confirmed are registered in the queue to be output to an external apparatus.
3 The next received image file is displayed making image confirmation become possible.
(11) When the key for pending is entered, the image confirmation procedure is terminated.

F. Output
(1) Output is conducted asynchronously with image reception and image confirmation.
(2) A queue is created and managed for each external apparatus, and each queue operates independently and does not interfere with one another. Therefore, output is asynchronously conducted for each apparatus.
(3) Information about in which queue of what external apparatus an image has been registered is stored as a queue registration table in the storage section 31, updated and managed every time an image is registered in the queue or deleted from the queue.
(4) Images that have been registered in the queue are sent out in sequential order, in which they were registered, to an external apparatus, and images that have been output are deleted from the queue.
(5) To conduct the output operation, specify an image file stored in the storage section 31 based on the number that has been registered in the queue.
(6) An output image is formed according to the condition stored in the image file. The image header is converted to the format specified by each output apparatus and is transferred together with the image data.

G. Output Image Forming

[Image Forming Processing Conducted by the Output Image Forming Section 43]
1 Image data is read from the storage section 31 to the image memory.
2 Frequency processing is conducted.
3 Equalization processing is conducted.
4 Gradation processing is conducted.
5 An image is rotated.
6 Mirror reversal is conducted.
7 Enlargement or reduction is conducted.
8 Overlay is conducted.

Moreover, it is possible to specify in the condition information whether or not to conduct the processing procedures #2 to #8 for each output apparatus. Furthermore, it is also possible to specify that image data, to which specified processing procedures #2 to #8 have been applied, is stored as a processed image data file. Avoid reprocessing the commonly processed part of the image which is output to each output apparatus. For example, when an enlargement or reduction rate of the image varies depending on an output apparatus, if the image that has processing procedures up to #6 finished is stored, when the image is transferred to another apparatus, it is possible to cut back processing time necessary for conducting procedures #2 to #6 by reading the processed image, applying processing procedures #7 and #8 only, and transferring the image. Conduct processing procedures #5 and #6 simultaneously with one of the processing procedures #2, #3 or #4. This reduces the number of accesses to the memory, thereby reducing the processing time.

H. Utility Function

[a. Utility Function for Users]
Utility functions are restricted as passwords for a general user, manager, or maker. To change information about images, a manager password is required for security.

[b. Image File Operation]
1 An image file list is displayed and information about stored images is listed in sequential order of reception on the image display apparatus 22.
2 Selecting an image from the list will display patient information, condition information and the image in the same form as the image confirmation screen.
3 It is possible to change patient information, an image processing method, and an output method.
4 The image which has been specified as "pending" when a radiograph was taken can be unspecified by making reconfirmation at this point.
5 It is possible to determine whether to output the data to each external apparatus or change the sequential order of output.

[c. Radiography Log and Irradiation Log]
1 Radiographic information and patient information are statistically processed and a radiography log and an irradiation log are provided for a user.
2 It is possible to output the amount of radiography per radiographed region during a specified period and the list of radiographic conditions applied to daily radiographs.

[d. Customization]
The screen and operability can be customized for each user.

Next, image processing conducted by the medical image processing apparatus 2 according to this embodiment will be described. The medical image processing apparatus 2 can apply image processing to the image data, which has been obtained as described above and is displayed on the monitor of the diagnosis terminal 3, according to the image contents and monitor characteristics. Moreover, the program for executing the image processing method, described hereafter, is stored in the specified storage medium, such as a hard disk or a CD-ROM (not shown), read out to the work area of the medical image processing apparatus 2, and executed.

Figure 5:
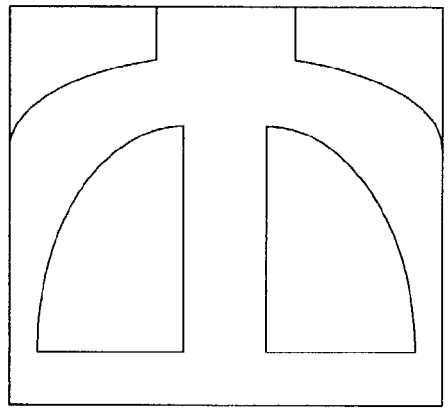
FIGS. 5(a) and 5(b) show examples of the radiation images display on a monitor 3a based on the image data.
Figure 5:
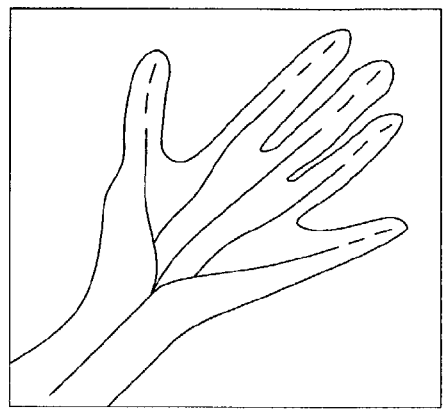

FIG. 5 illustrates an example of the radiation image displayed on the monitor 3a based on the image data (herein, the "medical department name" and "radiographed region" which are text data and attached to the image data are also shown). Moreover, the monitor 3a has a dynamic range that is fixed at 1:700 and also has the high-frequency characteristic that the image quality decreases by 30% at 3 lp/mm (line pair per millimeter). Those characteristics are to be stored beforehand in the medical image processing apparatus 2. The image of bones in the hand, shown in FIG. 5(b), is in a dynamic range of nearly 1:100 and includes much information in regard to the frequency characteristic of 1 to 2 lp/mm. Therefore, the image can be properly rendered on the monitor 3a.

However, the image of the blood vessels in the lung, shown in FIG. 5(a), is in a dynamic range of nearly 1:1000 and includes much information in regard to the frequency characteristic of 2 to 3 lp/mm. If the image data is directly input into the monitor 3a, the blood vessels that are to be viewed are not clearly viewed due to the characteristics. According to this embodiment, before the image data is input into the monitor 3a, the image data is converted such that the dynamic range is increased and (or) the frequency at vicinity of 2 to 3 lp/mm is enhanced. According to this embodiment, the conversion processing enables blood vessels in the lung in this example to be clearly rendered, thereby facilitating image interpretation.

Herein, how to evaluate the image contents becomes a problem. In the above-mentioned example, if the same conversion processing which has been applied to the image data of lung blood vessels is applied to the image data of the hand bones, the image of the hand bones may become rather difficult to view. Therefore, this embodiment evaluates image contents by the following two methods:

One method is to determine the image content (whether it is a bone or a blood vessel) by extracting the dynamic range and frequency components from the image data itself. The other method is to determine the image content by referring to the text data (serving as associate data), if attached, such as a "medical department name" or "radiographed region". In regard to the latter method, for example, when interpreting lung blood vessels from the chest image, the "medical department name" is to be the internal medicine; therefore, the above-mentioned conversion processing is applied to the image data. However, when interpreting the ribs from the chest image, the "medical department name" is to be the surgery; therefore, the conversion processing is not applied to the image data. It is recommended that the dynamic range and the frequency band that should be highlighted in the image be stored as a table in the storage section 41 of the medical image processing apparatus 2.

Referring to FIG. 6, the foregoing will be further detailed in the following. In the main controller 21 of the medical image processing apparatus 2, a method of recognizing the contents of the image is selected by the operating actions of the operator, as shown in step S101 of FIG. 6. When the former method mentioned above is selected, the image data are read in order to conduct the image processing in step S102. While, when the latter method mentioned above is selected, the reading operation of the text data attached to the image data is conducted in step S103. Then, in step S104, the content of the image is determined through the above-mentioned process, and in step S105, the characteristics of the monitor 3a stored in advance in the storage section 41 are readout. Finally, in step S106, based on the information obtained in the above steps, the most suitable image processing is conducted. Incidentally, for instance, either a processing for decreasing the sharpness of the image by applying a filtering operation to the image data, based on such information that the monitor for displaying the image is superior in sharpness, or a processing for displaying a part of image-gradations, based on such information that the monitor for displaying the image is inferior in a number of gradations can be considered as the image processing utilizing information other than the above, the scope of the present invention is not limited to the above examples.

The present invention has been described in reference to the embodiment; however, the present invention is not limited to the above-mentioned embodiment and changes and improvements are definitely possible. For example, it is possible to process image data of the hand bones so that a specific dynamic range and a frequency band are highlighted. Furthermore, an image processing apparatus and an image processing method according to the present invention can be used for fields other than the medical field regardless of the above-mentioned embodiment.

Further, although an image-displaying monitor is exemplified as a visible-image outputting apparatus in the above-mentioned embodiments of the present invention, the imager 6, serving as an example of a printer, can be also categorized in the visible-image outputting apparatus. When the image is outputted from the imager 6, it becomes possible to obtain an optimum image by conducting the image processing which complies with the characteristics of the imager 6.

The present invention can provide an image processing apparatus, which applies suitable processing according to an image so as to properly render the image on the monitor, an image processing method, a program for executing the image processing method, and a storge medium that stores the program for exccuting the image processing method.

Disclosed embodiment can be varied by a skilled person without departing from the spirit and scope of the invention.

What is claimed is:

1. An image-processing apparatus for converting inputted first image data to second image data used in a visible-image outputting apparatus that forms a visible image based on said second image data, said image-processing apparatus comprising:
    a data-characteristics acquiring section to acquire data-characteristics of said first image data, including at least one of a gradation dynamic range and a frequency characteristic, by analyzing said first image data inputted into said image-processing apparatus;
    a memory section to store apparatus-characteristics of said visible-image outputting apparatus; and
    a processing section to adaptively change a data-converting method for converting said first image data to said second image data based on said data-characteristics of said first image data acquired by said data-characteristics acquiring section and said apparatus-characteristics of said visible-image outputting apparatus stored in said memory section;
    wherein said data-characteristics acquiring section selects associate data relating to said image data based on image data corresponding to an image of a part of a human body to be visualized by said visible-image outputting apparatus, and then said data-characteristics acquiring section acquires said data-characteristics of said first image data based on said associate data; and
    wherein said associate data includes information with respect to a name of a medical department in which said image of said part of the human body to be visualized by said visible-image outputting apparatus is utilized for making a diagnosis on said part of human body.

2. The image-processing apparatus of claim 1, wherein said associate data includes information with respect to a name of said part of the human body to be visualized by said visible-image outputting apparatus.

3. The image-processing apparatus of claim 1, wherein said visible-image outputting apparatus comprises an image-displaying monitor.

4. The image-processing apparatus of claim 1, wherein said visible-image outputting apparatus comprises a printer.

5. The image processing apparatus of claim 1, wherein the first image data represents a medical image captured by a medical radiographic imager.

6. An image-processing method for converting first image data inputted into an image-processing apparatus to second image data used in a visible-image outputting apparatus that forms a visible image based on said second image data, said method comprising:
    acquiring data-characteristics of said first image data, including at least one of a gradation dynamic range and a frequency characteristic, by analyzing said first image data inputted into said image-processing apparatus;
    storing apparatus-characteristics of said visible-image outputting apparatus in a memory;
    adaptively changing a data-converting method for converting said first image data to said second image data based on said data-characteristics of said first image data acquired in said acquiring step and said apparatus-characteristics of said visible-image outputting apparatus stored in said memory;
    selecting associate data relating to image data, which corresponds to an image of a part of a human body to be visualized, based on said image data; and
    acquiring said data-characteristics of said first image data based on said selected associate data;
    wherein said associate data includes information with respect to a name of a medical department in which said image of said part of the human body to be visualized is to be utilized for making a diagnosis on said part of human body.

7. The image-processing method of claim 6, wherein said associate data includes information with respect to a name of said part of the human body to be visualized.

8. The image-processing method of claim 6, wherein said visible-image outputting apparatus comprises an image-displaying monitor.

9. The image-processing apparatus of claim 6, wherein said visible-image outputting apparatus comprises a printer.

10. The image processing apparatus of claim 6, wherein the first image data represents a medical image captured by a medical radiographic imager.

11. A computer readable medium having a program stored thereon that is executable by a computer to cause the computer to execute an image-processing method for converting first image data inputted into an image-processing apparatus to second image data used in a visible-image outputting apparatus that forms an a visible image based on said second image data, said image-processing method comprising:

acquiring data-characteristics of said first image data, including at least one of a gradation dynamic range and a frequency characteristic, by analyzing said first image data inputted into said image-processing apparatus;

storing apparatus-characteristics of said visible-image outputting apparatus in a memory;

adaptively changing a data-converting method for converting said first image data to said second image data based on said data-characteristics of said first image data acquired in said acquiring step and said apparatus characteristics of said visible-image outputting apparatus stored in said memory selecting associate data relating to image data, which corresponds to an image of a part of a human body to be visualized, based on said image data; and acquiring said data-characteristics of said first image data based on said selected associate data;

wherein said associate data includes information with respect to a name of a medical department in which said image of said part of the human body to be visualized is to be utilized for making a diagnosis on said part of human body.

12. The image processing apparatus of claim 11, wherein the first image data represents a medical image captured by a medical radiographic imager.

* * * * *